Dec. 29, 1953     H. D. PETRI     2,663,895
BUSHING
Filed July 13, 1950

INVENTOR:
HECTOR D. PETRI,
BY Robert E Ross
AGENT.

Patented Dec. 29, 1953

2,663,895

UNITED STATES PATENT OFFICE 2,663,895

BUSHING

Hector D. Petri, Framingham, Mass., assignor to United-Carr Fastener Corporation, Cambridge, Mass., a corporation of Massachusetts Application July 13, 1950, Serial No. 173,524

3 Claims. (Cl. 16—2)

This invention relates generally to bushings and the like, and has particular reference to a bushing adapted for assembly into an opening in a supporting panel.

The object of the invention is to provide an improved bushing which has means thereon to enable the bushing to be snapped into engagement in a panel opening.

A further object of the invention is to provide a bushing in which a body member for extending through a panel opening is provided with a panel-engaging member disposed thereon which has a series of spring arms for engagement with the panel, and means for retaining the spring arms in predetermined position on the body.

A still further object of the invention is to provide a bushing which has a flange at one end of the body portion, and a panel-engaging member disposed on the body with a series of spring arms extending toward the flange, in which the panel-engaging member has means thereon for abutting the flange to maintain the ends of the spring arms in predetermined spaced relation to the flange.

Other objects of the invention will, in part, be obvious, and will, in part, appear hereinafter.

Figure 1:
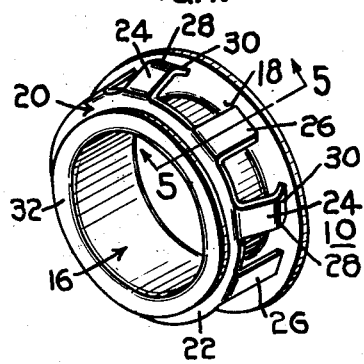
Fig. 1 is a view in perspective of a bushing embodying the features of the invention.
Figure 2:
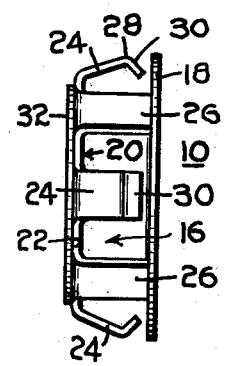
Fig. 2 is a view in elevation of the bushing of Fig. 1.
Figure 3:
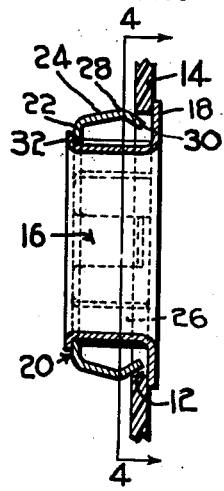
Fig. 3 is a view in sectional elevation of the bushing of Fig. 1 snapped into a panel.

Referring to Figs. 1 to 4 of the drawing, there is illustrated a bushing 10, which is adapted to snap into an opening 12 in a supporting panel 14, to allow an electrical conduit or similar device (not shown) to pass therethrough.

The bushing 10 comprises a hollow cylindrical body portion 16 for entering the opening 12, having a flange 18 disposed at one end thereof for bearing against the panel 14 when the bushing is assembled, and a panel-engaging member 20 assembled on the body portion. The panel-engaging member 20 comprises generally a ring portion 22 which is disposed about the body portion in spaced relation to the flange 18, a series of spring arms 24 disposed on the ring and extending generally toward the flange, and a series of spacing arms 26 disposed on the ring intermediate the spring arms. The spacing arms 26 extend generally parallel to the body 16 and terminate in ends which abut the flange 18. The spring arms 24 are each provided with an outwardly extending shoulder portion 28, and terminate in free ends 30. The spring arms 24 are shorter than the spacing arms 26, so that the free ends 30 are disposed in spaced relation to the flange 18. To retain the panel-engaging member 20 on the body portion 16, the end of the body opposite the flange is turned radially outwardly to provide a stop 32 against which the ring 22 bears.

Figure 4:
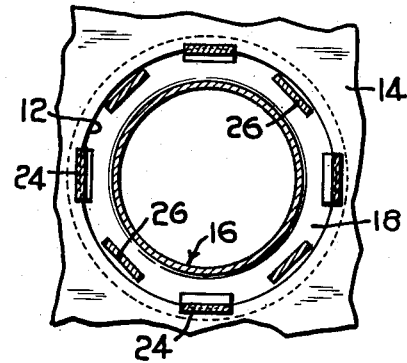
Fig. 4 is a view in section taken on line 4—4 of Fig. 3.

The bushing 10 is assembled with the panel 14 by inserting the end opposite the flange 18 into the opening 12, so that the spring arms 24 flex inwardly in passing therethrough, and then spring outwardly so that the free ends 30 engage the inner surface of the panel 14 (see Fig. 4). During the insertion, the spring arms 24 are free to flex, since they are held away from the flange by the spacing arms 26, thereby insuring that the flange 18 will not interfere with their action and the free ends 30 are properly spaced from the flange 18 to securely engage the panel.

Since the bushing 10 comprises two separate parts, that is, the body portion and the panel-engaging portion, it is convenient to form them of different types of metal to provide the characteristics desired. The body 16 is preferably formed of a relatively soft metal, such as low carbon steel, since it is formed by drawing operations performed on a flat blank. However, the panel-engaging portion is preferably formed of a high carbon steel which is capable of being hardened by heat treatment, since such treatment is necessary to provide the required strength in the spring arms. Such strength could not be conveniently imparted to the arms if the bushing body and the arms were formed of a single piece of metal, since blanks of high carbon steels could not be readily drawn into the shape of the body, and low carbon steels could not be strengthened sufficiently by heat treatment.

Figure 5:
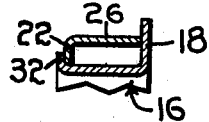
Fig. 5 is a view in section taken on line 5—5 of Fig. 1.
Figure 6:
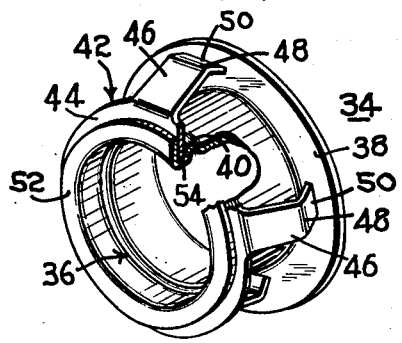
Fig. 6 is a perspective view partly broken away of a bushing having certain modifications within the scope of the invention.
Figure 7:
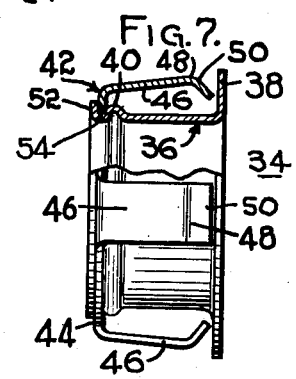
Fig. 7 is a view, in elevation, partly in section, of the bushing of Fig. 6.

Referring now to Figs. 5 and 6, there is illustrated a bushing 34 which has certain modifications within the scope of the invention. The bushing 34 comprises a cylindrical body portion 36 which has a flange 38 disposed at one end and an outwardly embossed peripheral rim 40 near the other end, and a panel-engaging member 42 assembled on the body. The member 42 comprises a ring portion 44 disposed about the body on the side of the rim opposite the flange, and a series of spring arms 46 extending from the ring toward the flange 38. The arms 46 have outwardly extending shoulder portions 48 disposed thereon, and terminate in free ends 50 which are spaced a predetermined distance from the flange 18. The end of the body 36 opposite the flange is turned radially outwardly to form a stop member 52 so that a groove 54 is formed between the rim 40 and the stop member. The ring 44 is seated in the groove 54, thereby maintaining the panel-engaging member in predetermined spaced relation to the flange 38, so that the free ends 50 of the spring arms will be free to flex without interference with the flange 38.

The method of assembly of the bushing 34 is similar to that described in connection with the bushing 10. The component parts of the bushing 34 may also be formed of different types of material for the purposes hereinbefore described.

Since certain obvious modifications may be made in the device without departing from the scope of the invention, all matter contained herein should be interpreted in an illustrative and not in a limiting sense.

I claim:

1. A bushing for snapping engagement with a panel through an opening therein, said bushing comprising a body portion for entering the opening, said body having flange means disposed thereabout for bearing against the panel; a panel-engaging member assembled on the body portion, said member comprising a ring portion disposed about the body and a series of spring arms extending generally toward the flange from the ring portion, said arms terminating in spaced relation to the flange and having outwardly extending snap shoulder portions disposed therein, means on said member extending from the ring portion toward the flange for contact therewith to retain said member in spaced relation thereto and means formed from the body for bearing against the ring on the side opposite the arms to retain the ring in engagement in the body.

2. A bushing for snapping engagement with a panel through an opening therein, said bushing comprising a body portion for entering the opening, said body having flange means disposed thereabout for bearing against the panel; a panel-engaging member disposed about the body portion, said member being spaced longitudinally on the body from the flange and having a series of spring arms disposed thereon which extend generally toward said flange and terminate in spaced relation thereto, said spring arms having outwardly extending snap shoulder portions disposed thereon, and spacing arms disposed on the ring intermediate said spring arms and extending toward the flange, the ends of said spacing arms butting against said flange, whereby the ends of said spring arms are maintained in spaced relation to said flange and outwardly extending means on the body bearing against the ring on the side opposite the arms to retain the ring on the body.

3. A bushing for snapping engagement with a panel through an opening therein, said bushing comprising a cylindrical body portion for entering the opening, said body having flange means disposed at one end for bearing against the panel; and a panel-engaging member assembled on the body portion, comprising a ring portion disposed about the body in spaced relation to the flange, a series of spring arms extending generally toward the flange from the ring portion, said arms terminating in spaced relation to the flange and having outwardly extending snap shoulder portions disposed therein, and spacing arms intermediate said spring arms, said spacing arms extending from the ring portion substantially parallel to said body toward the flange and having ends bearing against said flange whereby the ends of said spring arms are maintained in spaced relation thereto, the end of said body opposite the flange being turned radially outwardly to be against the side of the ring opposite the flange to retain said panel-engaging member thereon.

HECTOR D. PETRI.

References Cited in the file of this patent

UNITED STATES PATENTS

| Number | Name | Date |
|---|---|---|
| 1,483,218 | Fahnestock | Feb. 12, 1924 |
| 2,104,217 | Barnes | Jan. 4, 1938 |